(12) United States Patent
Le Blanc et al.

(10) Patent No.: US 8,715,405 B2
(45) Date of Patent: May 6, 2014

(54) SOL FOR SOL-GEL PROCESS COATING OF A SURFACE AND COATING METHOD BY SOL-GEL PROCESS USING SAME

(75) Inventors: Luc Le Blanc, Tournefeuille (FR); Elisa Campazzi, Boulogne Billancourt (FR); Patrick Savigne, Saint Nazaire (FR)

(73) Assignee: Airbus Operations SAS, Toulouse (FR)

( * ) Notice: Subject to any disclaimer, the term of this patent is extended or adjusted under 35 U.S.C. 154(b) by 1156 days.

(21) Appl. No.: 11/920,843

(22) PCT Filed: May 30, 2006

(86) PCT No.: PCT/FR2006/050493
§ 371 (c)(1),
(2), (4) Date: Nov. 21, 2007

(87) PCT Pub. No.: WO2007/003828
PCT Pub. Date: Jan. 11, 2007

(65) Prior Publication Data
US 2009/0148711 A1    Jun. 11, 2009

(30) Foreign Application Priority Data
May 31, 2005  (FR) .................... 05 51417

(51) Int. Cl.
C23C 18/12 (2006.01)
C09D 5/08 (2006.01)
C04B 24/42 (2006.01)
B32B 17/00 (2006.01)
B32B 17/10 (2006.01)
B32B 17/06 (2006.01)

(52) U.S. Cl.
CPC ............... *C04B 24/42* (2013.01); *B32B 17/00* (2013.01); *B32B 17/10* (2013.01); *B32B 17/061* (2013.01); *B32B 17/062* (2013.01); *B32B 17/063* (2013.01); *B32B 17/064* (2013.01); *B32B 17/065* (2013.01); *C09D 5/086* (2013.01); *C23C 18/1254* (2013.01); *C23C 18/1295* (2013.01)
USPC .............. 106/287.1; 106/287.12; 106/287.13; 106/287.14; 106/287.15; 106/287.16; 427/331; 427/337; 427/372.2; 427/387; 428/429; 428/447

(58) Field of Classification Search
USPC .............. 106/287.1, 287.12, 287.13, 287.14, 106/287.15, 287.16; 427/331, 337, 372.2, 427/387; 428/429, 447
See application file for complete search history.

(56) References Cited

U.S. PATENT DOCUMENTS

| | | |
|---|---|---|
| 4,754,012 A | 6/1988 | Yoldas et al. |
| 4,814,017 A | 3/1989 | Yoldas et al. |
| 4,895,767 A | 1/1990 | Mori et al. |
| 5,182,143 A | 1/1993 | Holmes-Farley et al. |
| 5,357,320 A | 10/1994 | Kashimura et al. |
| 5,644,014 A | 7/1997 | Schmidt et al. |
| 5,806,562 A | 9/1998 | Park |
| 5,814,137 A * | 9/1998 | Blohowiak et al. ........ 106/14.13 |
| 5,849,110 A | 12/1998 | Blohowiak et al. |
| 5,869,140 A | 2/1999 | Blohowiak et al. |
| 5,869,141 A | 2/1999 | Blohowiak et al. |
| 5,939,197 A | 8/1999 | Blohowiak et al. |
| 5,958,578 A | 9/1999 | Blohowiak et al. |
| 6,008,285 A | 12/1999 | Kasemann et al. |
| 6,037,060 A | 3/2000 | Blohowiak et al. |
| 6,197,101 B1 * | 3/2001 | Matsumura et al. ..... 106/287.11 |
| 6,228,921 B1 | 5/2001 | Kasemann et al. |
| 6,287,372 B1 * | 9/2001 | Briand et al. ............... 106/14.05 |
| 6,361,868 B1 | 3/2002 | Bier et al. |
| 6,482,525 B1 | 11/2002 | Kasemann et al. |
| 6,579,472 B2 * | 6/2003 | Chung et al. ............. 252/389.31 |
| 6,605,365 B1 * | 8/2003 | Krienke et al. ................ 428/472 |
| 2003/0024432 A1 | 2/2003 | Chung et al. |
| 2007/0240614 A1 * | 10/2007 | Lynch ....................... 106/287.14 |

FOREIGN PATENT DOCUMENTS

| | | |
|---|---|---|
| DE | 41 18 184 A1 | 12/1992 |
| EP | 0 195 493 | 9/1986 |
| EP | 0 587 067 A2 | 3/1994 |

* cited by examiner

*Primary Examiner* — David M Brunsman
(74) *Attorney, Agent, or Firm* — Oblon, Spivak, McClelland, Maier & Neustadt, L.L.P.

(57) ABSTRACT

Sol for the sol-gel coating of a surface, said sol comprising, in percent by weight:
a)—3% to 30%, preferably 5% to 20%, more preferably 7% to 15%, especially 8% to 14%, more especially 10% to 13%, for example 10.8% or 12%, of at least one organometallic compound of zirconium, aluminium or titanium;
b)—5% to 50%, preferably 5% to 40%, more preferably 10% to 40%, especially 15% or 20% to 30%, for example 22% or 23%, of at least one organosilane compound;
c)—1% to 15%, preferably 2% to 10%, more preferably 3% to 8%, for example 5%, of at least one compound selected from acids, bases, glycols and ethoxyethanol;
d)—the remainder to 100% of demineralized or distilled water;
the total amount of a) and b) being greater than 30%, preferably greater than 31.2%; 31.5%; 32%; or 33%, more preferably greater than 35%, especially greater than 40%, more especially greater than 50%.
Kit comprising:
a first container containing a first part A, in liquid form, comprising components a), c) and d) of the sol;
a second container containing a second part B, in liquid form, comprising component b) of the sol.
Process for preparing a sol-gel layer employing said sol and layer thus obtained, and substrate coated with at least one such sol-gel layer.
Process for preparing a coating comprising two or more layers on a surface of a substrate, at least one of these layers being a sol-gel layer prepared by the process above.

65 Claims, No Drawings

SOL FOR SOL-GEL PROCESS COATING OF A SURFACE AND COATING METHOD BY SOL-GEL PROCESS USING SAME

This application is a 371 filing of PTC/FR2006/050493, filed May 30, 2006.

TECHNICAL FIELD

The invention relates to a sol for the sol-gel coating of a surface, more particularly of a surface comprising a metal or a metal alloy, preferably of a surface composed of a metal or a metal alloy.

The invention likewise relates to a process for sol-gel coating a surface, more particularly a surface comprising a metal or a metal alloy, that uses said sol.

The technical field of the invention may be defined, generally speaking, as being that of the treatment of surfaces, made of metal or of metal alloy, for example, in particular the coating of surfaces made, for example, of metal or of metal alloy, such as titanium, aluminium and their alloys, that are used in particular in the aviation industry.

More specifically, the invention is located within the field of the preparation of surface coatings, known as sol-gel surface coatings, on the surface of substrates made, for example, of metals or of metal alloys, for the purpose of endowing this surface with chemical and/or mechanical resistance properties, such as corrosion resistance and abrasion resistance, and/or in order to promote the adhesion to the substrate, made for example of metal or of alloy, of an organic coating layer such as a primer, paint, mastic, adhesive or resin layer; in that case the function of the sol-gel coating is similar to that of conventional conversion treatments or adhesion promoters.

Conversion treatments lead to a (superficial) structural modification of the metal substrate (alloys of aluminium, titanium and other metals) by an anodization process (an operation of electrolysis, for example chromic, sulphuric or phosphoric anodic oxidation) or by a simple chemical conversion process (for example, chromatizing or phosphatizing).

Anodizing allows a highly adherent layer of oxide (or hydroxide) to be grown, at the expense of the base metal, said layer being placed in an anode situation. On aluminium alloys, in particular, the baths of chromic acid lead to the formation of a fine (several microns) layer which is porous and exhibits a good capacity for the adhesive bonding of organic coatings.

Among the chemical conversion processes, chromatizing allows the formation of a highly adherent, thin deposit of metal chromates, by contacting the surface of the component to be treated (typically alloys of aluminium, zinc or steels) with an acidic solution based on dichromates and fluorine-containing activators. This treatment enhances the corrosion resistance of the substrate and is also used as a tie base for paints.

Because of the fact that they use strong acids or bases and toxic materials such as chromates in immersion tanks, these surface treatment processes exhibit many disadvantages, particularly with regard to their harmful influence on the environment.

This is because these processes require substantial amounts of water for rinsing the excess treatment solutions from the treated components; the rinsing water and the spent process solutions must be treated in order to remove the dissolved metals, before they are disposed of or re-used; the removal of the metals produces additional toxic waste, which is difficult to purify and to dispose of.

The entirety of these treatments, subsequent to the implementation of the processes, increase the cost of use of the conventional wet-chemical processes.

Similarly, components treated at the end of their life, or in renovation phases, give rise to toxic waste which is prejudicial for the users.

Consequently processes have been proposed which employ the sol-gel coating technique in order to overcome the disadvantages of the aforementioned wet-chemical processes. Such processes are described in particular in the documents U.S. Pat. Nos. 5,814,137, 5,849,110, 5,789,085, 5,869,141, 5,958,578, 5,869,140, 5,939,197 and 6,037,060.

The document U.S. Pat. No. 6,605,365, in particular, describes the use of sols containing an alkoxyzirconium compound such as tetra-n-propoxy-zirconium (TPOZ) and an organosilane such as 3-glycidyloxypropyltrimethoxysilane (GTMS) with an organic acid catalyst such as acetic acid.

The sols are highly dilute sols having, for example, a solids content of the order of 3% to 5%; for higher concentrations, problems of adhesion of the film are mentioned.

These dilute sols allow the deposition only of fine layers or films, with a dry thickness for example of 200 up to 500 mm, by prolonged contact with the surface. The film obtained does indeed adhere well to the support and allows the subsequent adhesion of primer or of paints, but does not possess intrinsic properties of resistance to corrosion.

In other words, that document relates fundamentally to adhesion promoter films, and does not cite particular anti-corrosion properties intrinsically and inherently linked with the sol-gel film in tandem with the spray application of concentrated products.

Ultimately, where a paint, a primer, an adhesive or a mastic is applied, its application must be carried out within a very short period after the drying of the film.

The document U.S. Pat. No. 5,814,137 describes a surface treatment for metallic surfaces, composed in particular of alloys of titanium or of aluminium, which uses a sol-gel film to form a surface coating, used as an interface, in order to enhance the adhesion between the metal and an organic resin or an adhesive.

The sol-gel film, applied on its own, provides little or no corrosion resistance and promotes adhesion by way of an organometallic coupling agent on the surface of the metal.

A sol is used to prepare the sol-gel film on the surface of the metallic substrate; this sol is a dilute solution of a stabilized organometallic alkoxyzirconium salt, such as tetraisopropoxyzirconium or tetra-n-propoxyzirconium (TPOZ), an organosilane coupling agent such as 3-glycidyloxypropyl-trimethoxysilane (GTMS) for epoxy or polyurethane systems, or the corresponding primary amine for polyimide compositions, and a catalyst, such as acetic acid for aqueous formulations. Alcohol-based formulations are also described.

The sol is applied to the metallic surface by immersion, spraying or dipping and then dried to form the sol-gel film.

The sol is a dilute solution in the sense that the concentrations of reactant in the sol are 2% by volume of GTMS and 1% by volume of TPOZ; however, it is indicated that a slightly higher concentration of reactants, namely a total concentration of TPOZ and GTMS of 4.4%, may give better results.

The amount of acetic acid, which functions principally as a catalyst for the hydrolysis, is 0.13 mole of glacial acetic acid to 0.091 mole of organosilane—doubling the concentration of acetic acid to 0.26 mole improves the adhesion, but going to 0.39 mole impairs it.

It is indicated, finally, that it is preferable to minimize the amount of acetic acid.

Column 13 of that document cites a sol which is a solution in isopropanol of 2% of GTMS, 1% of TPOZ and 1% of 80% strength acetic acid.

To give a sol-gel coating able to get up to several tens of microns, the processes and solutions described in the documents above necessitate the successive deposition of two or more superposed layers and/or sprinkling or prolonged trickling, since the thickness deposited per layer is low.

Owing to the substantial number of steps required in order to deposit a coating of appropriate thickness, the sol-gel treatments described in these documents are difficult to employ on an industrial scale, and they can only be inserted into the chemical sequences of metal surface treatment at the expense of considerable means and of a substantial loss in productivity.

Moreover, the sol-gel films obtained, used on their own, i.e. without primers, in the documents cited above, still have insufficient performance in terms of anti-corrosion protection as defined by the salt-spray resistance or filiform corrosion resistance tests.

Other sol compositions for the preparation of sol-gel coatings are described in documents U.S. Pat. Nos. 4,814,017 and 4,754,012. These sols have the disadvantage of containing high levels of organic solvents.

Still other documents relating to compositions for the preparation of sol-gel coatings are the documents U.S. Pat. Nos. 6,008,285, 6,228,921, and 6,482,525, and 6,361,868. These documents, and particularly the first three cited, again describe compositions with high levels of organic solvents.

Moreover, the essential objective of the coatings obtained is to impart scratch resistance to polycarbonate substrates, which necessarily implies a prior treatment of the polycarbonate with a silane.

In summary, the outcome of the text above is that the disadvantages of the sols and sol-gel processes of the prior art originate essentially from the presence of high levels of solvents and/or from a complicated implementation and/or from poor anti-corrosion performances of the sol-gel film alone.

In the light of the above, therefore, there exists a need for a sol or solution, and for a process for treating a surface, for example of a metal surface, that makes it possible to prepare a sol-gel coating having a relatively substantial dry thickness, in accordance with the requirements and the case under consideration, in a limited number of steps.

There also exists a need for a sol or a solution, and for a process for treating a surface, made of metal, for example, that allows a sol-gel coating to be obtained that has an enhanced corrosion resistance as defined in particular by the salt-spray treatment test.

This enhancement to the protection must be achieved without detriment to the other properties of the sol-gel coating, described in particular in the documents cited above, and comprising, for example, the adhesion to the support, a metal support for example, the flexibility, the filiform corrosion resistance, the adhesion of primers and paints to the sol-gel coating, and the scratch resistance, chemical resistance and wear resistance.

There also exists a need for a sol which has a low or zero solvent content, particularly in terms of noxious or toxic solvents, and in terms of other compounds that might have an adverse influence on the environment.

There exists, finally, a need for a process for preparing a sol-gel coating on a surface, for example a metal surface, that is simple, reliable, easy to carry out, which comprises a limited number of steps, and which can easily be integrated into the existing processes for surface treatment, for example treatment of metal surfaces, without giving cause for substantial modifications to these processes, and with low levels of investment cost.

The aim of the invention is to provide a sol which is intended for the sol-gel coating of a surface, for example of a surface comprising a metal, and a process for preparing a sol-gel coating on a surface, for example a surface comprising a metal or a metal alloy, that uses said sol, which meet the needs set out above, among others, and which satisfy the criteria and requirements mentioned earlier on above.

A further aim of the invention is to provide a sol and a process for preparing a sol-gel coating on a surface, for example a surface comprising a metal or a metal alloy, that do not exhibit the disadvantages, defects, limitations and drawbacks of the prior-art sols and processes, and which resolve the problems of the sols and processes of the prior art.

This objective and other, further objectives are achieved in accordance with the invention by a sol for the sol-gel coating of a surface, said sol comprising, in percent by weight:

a)—3% to 30%, preferably 5% to 20%, more preferably 7% to 15%, especially 8% to 14%, more especially 10% to 13%, for example 10.8% or 12%, of at least one organometallic compound of zirconium, aluminium or titanium;

b)—5% to 50%, preferably 5% to 40%, more preferably 10% to 40%, especially 15% or 20% to 30%, for example 22% or 23%, of at least one organosilane compound;

c)—1% to 15%, preferably 2% to 10%, more preferably 3% to 8%, for example 5%, of at least one compound selected from acids, bases, glycols and ethoxyethanol;

d)—the remainder to 100% of demineralized or distilled water;

the total amount of a) and b) being greater than 30%, preferably greater than 31.2%; 31.5%; 32%; or 33%, more preferably greater than 35%, especially greater than 40%, more especially greater than 50%.

The weight percentages given above are generally equivalent to volume percentages.

Preferably said sol comprises less than 5%, preferably less than 3%, more preferably less than 1% by weight of non-toxic or non-noxious organic solvents, selected preferably from alcohols such as non-toxic or non-noxious 1 to 10 C aliphatic alcohols, such as isopropanol.

The sol according to the invention is fundamentally different from the sols of the prior art such as those described in the documents mentioned earlier above, in the sense that the concentrations of components a), b) and c), namely of the organometallic compound, the organosilane and the catalyst, for example acid, are markedly greater than those employed in these documents. Moreover, the total amount—concentrated—of a) and b) is greater than 30%, which is markedly greater than the total concentration of a) and b) in the prior art.

This increase in the concentration is made at the expense of the distilled or demineralized water. Accordingly, the concentration of organometallic compound such as TPOZ is 3% to 30% by weight, whereas in the prior art it is not more than 1.25% by weight; similarly, the concentration of organosilane compound such as GLYMO is from 5% to 50% by weight, whereas in the prior art it is not more than 2.50% by weight; finally, the concentration of catalyst c), for example of acid catalyst, such as acetic acid, is from 1% to 15% by weight, whereas it is not more than 0.60% by weight in the prior art.

The significant increase in the amount of each of the components is likewise demonstrated by the increase in the value of the weight solids content, which passes from 2% to 4% for the sols of the prior art to values of more than 4%, and possibly, for example, up to 37%, preferably values from 4% to 37%, more preferably values of 18% to 37%, especially of 20% to 30%, with the sols of the invention.

The increase in the concentration of the compounds that can be defined as precursor compounds to the sol-gel coating, namely the organometallic compound and the organosilane compound, is obtained specifically by virtue of the increase of the percentage of component c), for example of acid, such as acetic acid, which makes it possible to obtain compatibility and solubility for such concentrated mixtures, while remaining substantially within the same ratios between the amounts of organometallic compound a) and of organosilane compound b) as in the documents cited earlier on above.

The ratio of the organosilane compound to the organometallic compound is generally from 1.5 or 1.6 to 6, preferably from 1.8 to 2.5.

It was absolutely not obvious, in the light of the documents of the prior art, that concentrated sols of this kind could be prepared; indeed, the entirety of these documents tend more to dissuade the practitioner from using high concentrations of components a) and b) and of component c) such as acetic acid. In particular, document U.S. Pat. No. 6,605,365 indicates adhesion problems when concentrated sols are employed, for example sols having a solids content of more than 4% or 5%.

By increasing the concentrations of these components a), b) and c), by ensuring that the total amount or concentration of a) and b) is greater than 30%, preferably greater than 31.2%; 31.5%; 32%; or 33%, without using additional organic solvents or cosolvents, or else by using a very low proportion thereof, the inventors are therefore going against a widely held opinion in this field of the art, and are demonstrating that, surprisingly, sols which are stable and easy to use can be prepared even at high concentrations, by increasing, simultaneously with the concentration of components a) and b), the concentration of component c), for example of acid c), at the expense of the distilled or demineralized water.

The sols according to the invention make it possible, surprisingly, and specifically on account of their high concentration, to obtain dry sol-gel films having a relatively high thickness ranging generally from 500 mm to 20 µm or even more, depending on the formulation, preferably from 1 or 2 to 10 µm, more preferably from 4 to 5 µm. This thickness is obtained in a single layer, by a single operation of application (or pass), by techniques such as dipping, sprinkling or spraying. Films of this kind can only be prepared with the prior-art sols by successive depositions of two or more layers and in a plurality of operations of application.

Moreover, the films prepared from the concentrated sols according to the invention are of excellent quality and in particular have a regular thickness, without sags.

The increase in the concentration of the sols according to the invention is produced without an increase in the organic solvent content; this is because the sols according to the invention, in contrast to many prior-art sols, contain less than 5% by weight, preferably less than 3% by weight, more preferably less than 1% by weight of organic solvents.

Furthermore, when organic solvents of this kind are included in the compositions of the invention at these very low concentrations, the solvents in question are non-toxic or non-noxious solvents such as alcohols, preferably 1 to 10 C, and especially 1 to 4 C, aliphatic alcohols, such as isopropanol.

By virtue in particular of the increase in the dry thickness deposited per layer, which ranges, for example, from 0.5 to 2, 3, 4, 5 or even 20 µm or more, instead, generally, of several hundred nanometres in the prior art, the intrinsic corrosion protection performance of the sol-gel films obtained from the sols according to the invention is significantly improved relative to that of the sol-gel films obtained from the prior-art sols.

Thus, by way of example, depending on the grade of aluminium or the metal of the support in question, and according to the drying temperature of the sol-gel film, which can be from 0 to 500° C., preferably from 80° C. to 150° C., more preferably from 110 to 130° C., and which even, in the case of a ceramic melting treatment, may be up to 2500° C., it is possible with the sol-gel films prepared with the sol according to the invention to obtain levels of salt-spray protection from several tens to several hundred or even thousand hours (test ASTM B117). For comparison with the sol-gel coatings of the prior art, the salt-spray resistance of the sol-gel film alone is less than 24 hours on a 2024T3 aluminium support which has been deoxidized beforehand.

Excellent results are also obtained for filiform corrosion.

In other words, it is demonstrated that the film according to the invention achieves corrosion protection which is provided by a barrier layer effect due to the film on its own, and does so in spite of the fact that no anti-corrosion agents are incorporated into the film according to the invention.

This excellent level of protection obtained with the sol-gel film alone is achieved with a film whose dry thickness is generally from 500 nm to 20 µm, being for example 1, 2, 3 or 4 µm without detriment to the properties traditionally exhibited by sol-gel films, as described in particular in the above-mentioned documents of the prior art, namely: adhesion to a wide variety of supports, such as aluminium, titanium, stainless steel, composite materials, plastics, glasses, etc., which may have been pretreated; flexibility; adhesion of primers and paints to the sol-gel film; but also scratch resistance; chemical resistance; wear resistance, etc.

It is one of the additional advantages of the "concentrated" sol according to the invention that it has a much wider field of use than the dilute sols of the prior art as described in particular in the documents mentioned earlier on above.

This is because the sols according to the invention can be used not only to prepare sol-gel coatings which are substituted for chromate conversion products, or for adhesion promoters for paints, mastics and adhesives, as already indicated in the aforementioned documents, but also to prepare sol-gel primers, sol-gel paints, and sol-gel coatings for specific applications.

The invention likewise provides a process for preparing a sol-gel layer on a surface of a substrate, wherein:
 a sol as described above is deposited on the surface to give a sol layer on the surface of the substrate;
 said sol layer is dried to give a sol-gel layer on the surface of the substrate.

The sol can be deposited by any known deposition process, for example by spraying, sprinkling or dipping.

Preferably the sol is applied by spraying, in a very simple way similar to the application of a paint or varnish.

The process according to the invention exhibits all of the advantages resulting from the use of the sol according to the invention, as described earlier on above; in particular, the process according to the invention allows the preparation of layers with a high dry thickness, namely, generally, of 500 nm to 20 µm, in a single step, in a single go (a single pass), instead of two or more steps in the prior-art processes that use dilute sols. The result is a substantial gain in time. By way of example, a film with a thickness of 2 to 10 µm can be applied in a few seconds in a way similar to the application of a varnish or paint.

Similarly, it is not necessary with the process of the invention to carry out trickling or prolonged sprinkling in the way described in certain prior-art documents in order to obtain the deposition of a layer of equal thickness.

The desired dry thickness of the layer deposited can easily be obtained by modifying, for example, the settings of the gun or guns, the type of gun, the number of these guns, and the application distance. A thick layer is obtained rapidly without prolonged contact or trickling. The thick layer obtained is of excellent quality, uniform, and without sags.

The process according to the invention is therefore simple, reliable, rapid and less costly than the prior-art processes. This process for preparing a sol-gel layer according to the invention can easily be integrated into a conventional, existing line which includes other treatments of the substrate before or after the preparation of the sol-gel layer, at low cost, without any substantial modifications or loss in productivity.

Lastly, the process according to the invention is environmentally compatible and meets the most recent directives relating to environmental protection, owing to the fact that the sol has a very low organic solvent content, generally less than 5% by weight, preferably less than 3% by weight, more preferably less than 1% by weight, and that these solvents are solvents which are neither toxic nor noxious, such as alcohols.

This represents a difference and an additional advantage of the sol and of the process of the invention relative to the prior-art processes which employ higher levels of solvents which in some cases are toxic, noxious and flammable.

The sol may advantageously be heated beforehand and/or during deposition; it has been found that such heating makes it possible, in particular, to catalyse the reaction that takes place in the sol, and to improve—to accelerate—the hydrolysis, the drying and application, and also the quality, the uniformity-evenness, of the resulting film.

Such heating may be particularly advantageous when an existing sol-gel film is retouched or repaired, since this greatly reduces the maturization time. Furthermore, it is preferable, and much easier, to carry out heating of the sol to be applied than of the substrate to which the sol is to be applied, since the size and geometry of the substrate may be such that they make it difficult to heat.

Such heating is particularly advantageous when the organosilane compound is selected, as will be seen later on below, from compounds whose hydrolysis reaction does not lead to the formation of methanol. The reason for this is that the hydrolysis of these compounds is slower and the heating makes it possible to accelerate it; moreover, controlled heating may also enhance the quality of the film obtained from the sol.

Consequently it will be possible to apply the sol at a temperature of 0 to 80° C., preferably of 20° C. to 60° C.

Advantageously the sol may be filtered prior to its application. This filtration may be performed, for example, by placing a filter ahead of the sprinkling or spraying nozzle, or of any other application system.

This filtration may be a conventional filtration or else a finer filtration such as an ultrafiltration or nanofiltration, and may be carried out by any device known to the skilled person.

The aim of this filtration is to retain any impurities of a size generally from a few nanometres to 20 µm.

The reason for this is that it has been found that this filtering operation greatly enhances the quality of film formed. The quality of the network formed, indeed, benefits from the removal of any impurities present in the sol, owing to the filtering operation.

Since the quality of the network formed is paramount in terms of corrosion resistance properties, these properties are, consequently, enhanced by this filtration.

In one preferred, particularly advantageous embodiment of the process according to the invention, the sol deposited on—applied to—the surface of the substrate is prepared—obtained—by simple mixing, optionally with heating under the conditions defined earlier on above, of only two, concentrated, liquid constituenty products, called part A and part B, whereas in the prior art, as defined for example in most of the aforementioned documents, the sol is prepared by mixing of four products or constituents, or even more.

Part A, which is in liquid form, comprises components a), c) and d) of the sol, which have already been described, whereas part B, which is also in liquid form, comprises component b) of the sol, which has already been described.

These two liquid constituents (part A and part B) are very easy to mix by means of conventional stirrer systems, and even manually in the case of small amounts.

The duration of stirring is generally from 5 minutes to 1 hour. Stirring may generally be carried out at a temperature of 20° C. to 80° C., depending on the desired rate of hydrolysis.

The two parts, A and B, are stable in storage and are generally each placed in a suitable pack or container for durations ranging generally from a few months to two years, necessitating possible simple homogenization prior to use. The mixture of the two parts A and B is also stable.

After mixing of the aforementioned parts A and B, the sol produced can be applied within a time of generally 0 minute to 24 months, preferably of 0 minute to 12 months, more preferably of 30 minutes to 8 hours, for example within a time of less than or equal to 1 hour, from the beginning of mixing.

The invention additionally provides a kit comprising:
a first container or pack containing a first part A, in liquid form, comprising components a), c) and d),
a second container containing a second part B, in liquid form, comprising component b).

For example, part B may be composed of the pure liquid silane.

Part A represents generally from 50% to 90%, preferably from 60% to 90% by weight of the sol end product obtained, and part B represents generally from 10% to 50%, preferably from 10% to 40% by weight of the sol end product obtained. A kit of this kind is easy to store and to use.

The invention also provides a sol-gel layer preparable by the above process, and a substrate or article at least one surface of which is coated with at least one such sol-gel layer. Examples of these substrates or articles are, for example, aircrafts.

The invention relates, furthermore, to the use of said sol-gel layer, prepared by the process according to the invention, for imparting corrosion resistance properties to a surface of a substrate, in particular to a surface made of a material selected from metals, metal alloys and composite materials comprising a metal or a metal alloy.

Advantageously, said surface is coated only with said sol-gel layer; in other words, said sol-gel layer is used alone on the surface.

The reason for this is that it has been found that the sol-gel layer according to the invention, or prepared by the process according to the invention, makes it possible, surprisingly, by itself—without any other coat of paint, primer or other coat being used—to impart corrosion resistance properties to said surface. This makes it possible to forgo the deposition of other layers, and results in an economy of money, of time and of weight, which is of particular interest, for example, in the aviation field.

The invention further provides a process for preparing a coating comprising two or more layers on a surface of a substrate, at least one of these layers being a sol-gel layer prepared by the process as described above.

In particular the invention additionally provides a process for preparing a coating comprising two or more layers on a surface of a substrate, wherein:

a sol-gel layer is prepared on said surface; then
one or more other layers is or are applied to said sol-gel layer, said other layers being selected, for example, from paint, primer, mastic, adhesive or resin layers.

Said layer or layers other than the sol-gel layer may be applied to the sol-gel layer immediately after its preparation, namely after drying, or else said layer or layers may be applied to the sol-gel layer within a certain time after its preparation, for example a time of one month to ten years.

The reason for this is that, since the sol-gel layer by itself possesses anti-corrosion properties, it is unnecessary to provide it with other layers straight away; such layers will be able to be prepared subsequently, at the time of a repair or inspection, where appropriate after light cleaning.

The coating may comprise two or more identical or different sol-gel layers selected, for example, from the sol-gel layers having the particular properties described later on below, and optionally one or more other layers selected, for example, from paint, primer, mastic, adhesive or resin layers.

The invention will be better understood from a reading of the detailed description below, which is given essentially in relation to the process of preparing a sol-gel layer on a surface of a substrate.

This process first comprises the deposition on said surface of a sol for the purpose of obtaining a sol layer on the surface of the substrate.

The substrate according to the invention may be any material capable of receiving a sol-gel layer. The process according to the invention is applied to very diverse materials with excellent results in terms of the properties of the resulting layer.

The substrate is generally made of a material selected from metals; metal alloys; organic or mineral, inorganic glasses; organic materials such as plastics; wood; papers; ceramics; textiles; concretes; stone; and composite materials comprising two or more of these materials. These materials may optionally be plated and/or surface-treated and/or coated, for example painted.

The material of the substrate may in particular be selected from aluminium; titanium; copper; iron; and alloys thereof, such as steels, for instance stainless steels, and Inconel.

The aluminium alloys include the grades 6056, 2024 and 7075.

The titanium alloys include the alloys Ti-6-4, Ti-15-3-3-3, Ti-6-2-2-2-2 and Ti-3-2.5.

The substrate may take any form whatsoever, but generally takes the form of a plate, sheet or foil. The process according to the invention, however, allows layers to be deposited on surfaces even of highly complex geometry. The surface on which the layer is deposited may be only part of the total surface of the substrate, but may also be the entirety of said surface; for example, with the process according to the invention, a layer can be deposited on both faces of a foil substrate.

Before the deposition of the sol on the surface it is generally preferable to clean and/or activate and/or pickle the surface, for example by a chemical and/or physical and/or mechanical treatment.

This is because such cleaning is important in order to obtain effective adhesion of the layer which is deposited. These cleaning processes are known to the skilled person: they may involve cleaning by a wet method, for example by acidic or basic solutions, or alkaline or solvent degreasing, or else cleaning by a dry method, for example by shotblasting and/or sandblasting and/or flaming (flame treatment).

For certain supports a particular treatment, of the adhesion-promoting type, may be added.

Cleaning and/or activating treatments of this kind are known to the skilled person and are widely described in the prior art, more particularly in the prior-art documents cited earlier on above, such as U.S. Pat. No. 5,869,141, whose description can be used as a reference.

The surface may optionally be coated with a surface treatment layer selected from simple and chromate conversion layers, anodizing layers, or other layers—this is the case in particular in the context of the repair of existing materials. The surface of this latter layer is therefore the surface on which the sol is deposited.

On the surface, preferably cleaned and activated, a sol is deposited which is, according to the invention, a concentrated sol containing the following compounds, whose amounts are expressed as percentages by weight:

a)—3% to 30%, preferably 5% to 20%, more preferably 7% to 15%, especially 8% to 14%, more especially 10% to 13%, for example 10.8% or 12%, of at least one organometallic compound of zirconium, aluminium or titanium;

b)—5% to 50%, preferably 5% to 40%, more preferably 10% to 40%, especially 15% or 20% to 30%, for example 22% or 23%, of at least one organosilane compound;

c)—1% to 15%, preferably 2% to 10%, more preferably 3% to 8%, for example 5%, of at least one compound selected from acids, bases, glycols and ethoxyethanol;

d)—the remainder to 100% of demineralized or distilled water;

the total amount of a) and b) being greater than 30%, preferably greater than 31.2%; 31.5%; 32%; or 33%, more preferably greater than 35%, especially greater than 40%, more especially greater than 50%.

The sol according to the invention is a concentrated sol, by comparison with the sols of the prior art, in which the weight solids content is generally from 2% to 4%. The sol according to the invention generally has a weight solids content of more than 4%, and possibly, for example, of up to 37% or more; preferably the solids content is from 4% to 37%, more preferably the solids content is from 18% to 37%, and more preferably from 20% to 30%.

Relative to the sols of the prior art, the different components a), b) and c) have their concentrations significantly increased; in particular, the increase in the percentage of component c), an acid for example, in the total formulation makes it possible to obtain compatibility and solubility in these concentrated mixtures for higher concentrations of components a) and b).

The ratio between the amounts of organometallic compound a), such as TPOZ, and of organosilane compound, such as GLYMO, remains, however, within the same ratios as in the prior art. Generally, speaking, the ratio of the organosilane compound, such as GLYMO, to the organometallic compound, such as TPOZ, is from 1.5 or 1.6 to 6, preferably from 1.8 to 2.5.

It is obvious that the degree of dilution, i.e. the amount of solvent a), water for example, incorporated into the sol according to the invention may be adjusted depending on the desired performance and thickness. Likewise, the ratio between the organometallic compound, such as TPOZ, and the organosilane compound, such as GLYMO, can be modified in accordance with the required priority performance parameters. The consequence of increasing this ratio will generally be to enhance the hardness of the film obtained and the anti-corrosion performance, in terms both of the salt-spray test and of the filiform corrosion.

The organometallic compound a) is selected from compounds whose metal is selected from zirconium, titanium and aluminium. Such compounds are described, for example, in the documents already cited earlier on above, and in document U.S. Pat. No. 6,361,868, whose description can be used as references.

The compound a) is generally of the formula (I) or of the formula (II) below:

  (I),

  (II), in which M represents Zr or Ti, R represents a separable, removable—for example hydrolysable—radical, R' represents a non-separable, non-removable—for example non-hydrolysable—radical and x is from 1 to 4 in the case of the formula (I) or from 1 to 3 in the case of the formula (II), and, if two or more radicals R and/or R' are present in a compound of formula (I) or of formula (II), they can be, respectively, identical or different.

A separable, removable—for example hydrolysable—radical is a radical which undergoes separation or is removed from the metal atom M (Zr, Ti or Al) when the compound is contacted with the solvent such as water (hydrolysis), and which does not remain attached to the metal atom.

A non-separable, non-removable—for example non-hydrolysable—radical is a radical which is not separated or removed from the metal atom M when the compound is contacted with the solvent d) such as water (hydrolysis), and which remains attached to the metal atom M.

The removable, separable, hydrolysable radical or radicals R is or are generally selected from halogens such as F, Cl, Br, and I, in particular Cl and Br; alkoxy groups, preferably $C_1$ to $C_{10}$, more preferably $C_1$ to $C_5$, especially $C_2$ to $C_4$ linear or branched alkoxy groups, such as, for example, methoxy, ethoxy, n-propoxy, isopropoxy, n-butoxy, isobutoxy, sec-butoxy, tert-butoxy, n-pentyloxy and n-hexyloxy groups; cycloalkyloxy groups, preferably $C_3$ to $C_{10}$ cycloalkyloxy groups, such as, for example, the cyclopropyloxy group and the cyclohexyloxy group; aryloxy groups, preferably $C_6$ to $C_{10}$ aryloxy groups, such as, for example, the phenoxy group; acyloxy groups, preferably $C_1$ to $C_4$ acyloxy groups, such as, for example, the acetoxy and propionyloxy groups; alkylcarbonyl groups, for example the acetyl group; ($C_1$ to $C_6$) alkoxy-($C_2$ to $C_3$)-alkyl groups (specifically a group derived from a $C_1$ to $C_6$ alkyl-ethylene glycol or propylene glycol). The alkoxy groups, in particular the methoxy group, and more particularly the ethoxy group, are the preferred hydrolysable radicals.

The group or groups R may optionally in addition contain one or more substituents selected generally from halogens and alkoxy groups.

The non-removable, non-separable—for example non-hydrolysable—radical or radicals R' is or are generally selected from hydrogen; the hydroxyl group; alkyl groups, preferably $C_1$ to $C_{10}$, more preferably $C_1$ to $C_4$, linear or branched alkyl groups, such as, for example, the methyl, ethyl, propyl, n-butyl, isobutyl, sec-butyl and tert-butyl groups; alkenyl groups, preferably $C_2$ to $C_4$ alkenyl groups, such as, for example, the vinyl, 1-propenyl, 2-propenyl and butenyl groups; alkynyl groups, preferably $C_2$ to $C_4$ alkynyl groups, such as, for example, the acetylenyl and propargyl groups; aryl groups, preferably $C_6$ to $C_{10}$ aryl groups, such as the phenyl and naphthyl groups; methacryloyl and methacryloyloxypropyl groups. It is possible for the group or groups R' optionally to contain, in addition, one or more substituents selected generally from halogens and alkoxy groups.

The preferred organometallic compounds are the compounds of formula $MR_4$ (M=Zr or Ti) or $AlR_3$, where R has already been defined above.

Among these compounds, further-preferred compounds are the compounds in which the 3 or 4 radicals R are identical and represent the same group, such as an alkoxy, aryloxy or cycloalkyloxy group.

The most preferred compounds are the titanium or zirconium tetra(alkoxide(s)), and the aluminium tri(alkoxide(s)), more particularly the zirconium tetra(alkoxide(s)). Even more-preferred compounds are tetra-n-propoxyzirconium ("TPOZ") and tetraisopropoxyzirconium.

The sol may contain only one organometallic compound, such as an aluminium, titanium or zirconium alkoxide, for example tetra-n-propoxyzirconium (TPOZ).

Alternatively the sol may comprise two or more organometallic compounds selected, for example, from the above-mentioned metal alkoxides and from other compounds.

Examples of organometallic compounds of component a) are as follows:

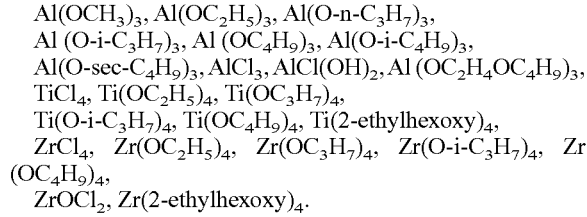

$ZrOCl_2$, $Zr(2\text{-ethylhexoxy})_4$.

Preferably the sol according to the invention comprises a single organometallic compound selected from zirconium alkoxides, such as TPOZ.

Organometallic compounds which can be employed in the sol according to the invention are described in particular in the above-mentioned documents, and especially in the documents U.S. Pat. Nos. 6,008,285, 6,228,921, 6,482,525, 6,361,868, whose description can be used as references.

The organosilane compound is a compound which may be referred to, as it is in numerous documents of the prior art, such as the document U.S. Pat. No. 5,814,137, as a silane coupling agent.

The organosilane compound b) is preferably a compound having at least one non-removable, non-separable, preferably non-hydrolysable, radical attached to the silicon, preferably a radical capable of providing particular properties, and at least one separable, removable, hydrolysable radical attached to the silicon. The terms "removable and non-removable" have already been defined above.

The organosilane compound preferably contains 2 or 3, in particular 3, removable, separable—for example hydrolysable—radicals and one or two, in particular one, non-separable, non-removable—for example non-hydrolysable—radical(s).

Said separable, removable—for example hydrolysable—radical or radicals is or are selected generally from halogens such as F, Cl, Br, and I, in particular Cl and Br; alkoxy groups, preferably $C_1$ to $C_{10}$, preferably $C_1$ to $C_5$, especially $C_2$ to $C_4$ linear or branched alkoxy groups such as the methoxy, ethoxy, n-propoxy, isopropoxy, n-butoxy, isobutoxy, sec-butoxy, tert-butoxy, n-pentyloxy and n-hexyloxy groups; cycloalkyloxy groups, preferably $C_3$ to $C_{10}$ cycloalkyloxy groups, such as, for example, the cyclopropyloxy group and the cyclohexyloxy group; aryloxy groups, preferably $C_6$ to $C_{10}$ aryloxy groups, such as the phenoxy group; acyloxy groups, preferably $C_1$ to $C_4$ acyloxy groups such as, for example, the acetoxy and propionyloxy groups; and alkylcarbonyl radicals such as the acetyl radical. The preferred separable, removable—for example hydrolysable—radicals are alkoxy radicals and particularly the ethoxy group.

Said non-separable, non-removable—for example non-hydrolysable—radical or radicals is or are selected generally from hydrogen; the hydroxyl group; the mercapto group; the cyano group; alkyl groups, preferably $C_1$ to $C_{10}$, more preferably $C_1$ to $C_4$, linear or branched alkyl groups, such as the methyl, ethyl, propyl, n-butyl, isobutyl, sec-butyl and tert-butyl groups; alkenyl groups, preferably $C_2$ to $C_4$ alkenyl groups such as the vinyl, 1-propenyl, 2-propenyl and butenyl groups; alkynyl groups, preferably $C_2$ to $C_4$ alkynyl groups such as the acetylenyl and propargyl groups; aryl groups, preferably $C_6$ to $C_{10}$ aryl groups such as the phenyl and naphthyl groups; alkylaryl groups; arylalkyl groups; (meth)acryl and (meth)acryloxypropyl groups; the glycidyl and glycidyloxy groups; and groups such as alkyl, alkenyl, alkynyl, alkylaryl and arylalkyl groups that contain at least one group selected from primary, secondary or tertiary amino group—the non-hydrolysable radical in this case being, for example, an aminoaryl or aminoalkyl group—amide, alkylcarbonyl, substituted or unsubstituted aniline, aldehyde, ketone, carboxyl, anhydride, hydroxyl, alkoxy, alkoxycarbonyl, mercapto, cyano, hydroxyphenyl, alkyl carboxylate, sulphonic acid, phosphoric acid, (meth)acryloxyloxy groups, groups containing an epoxide ring such as glycidyl and glycidyloxy, allyl and vinyl groups.

Said separable, removable, hydrolysable radicals and said non-separable, non-removable, non-hydrolysable radicals may, in addition, be optionally substituted by one or more substitutents selected generally from alkoxy groups and halogen atoms.

The particularly preferred organosilane compounds are of the formula below:

$$Si(R_1')(R_1)_3 \qquad (III),$$

where the radicals $R_1$ are identical or different from one another, preferably identical, and represent a separable, removable—for example hydrolysable—group as defined above, preferably a $C_1$ to $C_4$ alkoxy group, more preferably an ethoxy or methoxy group; and $R_1'$ is a non-separable, non-removable—for example non-hydrolysable—radical as defined above, preferably a glycidyl or glycidyloxy-$C_1$ to $C_{20}$, preferably $C_1$ to $C_6$, alkylene group, for example a γ-glycidyloxypropyl radical, a β-glycidyloxyethyl radical, a τ-glycidyloxybutyl radical, an ε-glycidyloxypentyl radical, an ω-glycidyloxyhexyl radical and a 2-(3,4-epoxycyclohexyl) ethyl radical; or a group containing at least one primary, secondary or tertiary amino group selected preferably from the 3-aminopropyl, N-(2-aminoethyl)—3-aminopropyl and N—[N'-(2'-aminoethyl)—2-aminoethyl]-3-aminopropyl groups.

Advantageously the organosilane compound is selected from the following compounds:
allyltrimethoxysilane,
N-(2-aminoethyl)-3-aminopropyltrimethoxysilane,
N—[N'-(2'-aminoethyl)-2-aminoethyl]-3-aminopropyl-trimethoxysilane,
3-aminopropyltrimethoxysilane,
3-glycidyloxypropyltrimethoxysilane (GLYMO),
3-mercaptopropyltrimethoxysilane,
3-methacryloxypropylmethyldimethoxysilane,
3-methacryloxypropyltrimethoxysilane,
N-phenylaminopropyltrimethoxysilane,
vinyltrimethoxysilane.

Among the compounds listed above, the preferred compound is GLYMO.

According to one particularly preferred and advantageous embodiment of the invention, the organosilane compound is selected from compounds whose hydrolysis reaction does not lead to the formation of methanol. The reason for this is that methanol is a very toxic product, whose formation must be avoided.

The majority of the documents of the prior art, and in particular the United States patents cited above, take absolutely no account of this criterion, which is very important for the safety of the personnel carrying out the deposition of the sol, and they give lists of silanes that include numerous compounds that can lead to the production of methanol. The advantageous nature of the employment of such silanes is manifested with even greater clarity with the sols according to the invention, whose silane concentration is much higher than in the prior art.

Organosilanes of this kind which do not lead to the production of methanol on hydrolysis are generally compounds which do not contain groups such as methoxy groups, and they may be selected from the following compounds:
3-aminopropyltriethoxysilane,
p-aminophenylsilane,
3-aminopropyltriethoxysilane,
3-glycidyloxypropyldiisopropylethoxysilane,
3-glycidyloxypropyltriethoxysilane,
(3-glycidyloxypropyl)methyldiethoxysilane,
3-mercaptopropyltriethoxysilane,
3-methacryloxypropylmethyldiethoxysilane,
vinylmethyldiethoxysilane,
vinyltriethoxysilane,
N-[(3-(triethoxysilyl)propyl]-4,5-dihydroxyimidazole.

More specifically, the GLYMO may thus be replaced by GLYEO or 3-glycidyloxypropyltriethoxy-silane, which is free from methoxy radicals. Laboratory tests have shown that replacing GLYMO by GLYEO in a sol otherwise comprising the same components leads to a film which possesses the same performance characteristics, in terms both of the quality of the film and of the anti-corrosion performance.

Silane compounds which can be employed in the process of the invention are described in particular in the abovementioned documents and in the document EP-A-0 195 493, whose description can be used as reference.

Component c), which may be referred to as a catalyst, may be selected from acids, bases, glycols, and other compounds such as ethoxyethanol.

When component c) is an acid, it may be selected preferably from organic acids, inorganic acids and mixtures thereof.

The organic acids may be in particular be selected from carboxylic acids such as aliphatic monocarboxylic acids, for instance acetic acid, polycarboxylic acids such as dicarboxylic acids and tricarboxylic acids, for example citric acid, and mixtures thereof.

Among the inorganic acids use may be made of nitric acid or hydrochloric acid and mixtures thereof.

When compound c) is a base it may be selected from amines such as ethanolamine, triethylamine and mixtures thereof. A base is used in particular when the acids would be prohibited because of the nature of the substrate or of the silane employed.

Other compounds which can be employed as component c) are described in the aforementioned documents.

The solvent d) is demineralized or distilled water. One or more non-toxic or non-noxious solvents, such as alcohols, preferably aliphatic alcohols which contain from 1 to 10, especially from 1 to 4, carbon atoms, such as ethanol, n-propanol, isopropanol and n-butanol, may additionally be included in the solvent d).

The preferred solvent is distilled or demineralized water.

Components a), b), c) and d) are the essential compounds of the sol according to the invention, and form a base composition to which, depending on the requirements and the desired properties, it is possible to add one or more additional, optional components, which are described below.

The sol may further comprise at least one surfactant in order to enhance the wetting and spreading properties on the various substrates, but also the quality of the network formed and the intrinsic anti-corrosion properties of the sol-gel film.

These surfactants include ionic surfactants, which include sarcosinates such as sodium lauroyl sarcosinate in the form, for example, of a 30% strength aqueous solution; and non-ionic surfactants, such as ethoxylated fatty alcohols.

The surfactants are generally present in a proportion of 0.05% up to 2% or 3% by weight of the sol.

The improvement in wetting by addition of suitable surfactants allows uniform films to be obtained without popping phenomena or phenomena of shrinkage on drying, on correctly prepared surfaces. The possible anti-corrosion properties of the surfactant may then reinforce the quality of the protection.

The sol may further comprise at least one organic binder, which is generally a resin or a polymer selected, for example, from epoxy binders, polyurethane binders, vinyl binders, polyester binders, diol binders, acrylate binders, and binders which react or crosslink under UV, or photopolymerized binders, and glycerophthalate resins. In particular the binder is selected from binders which are compatible with the highly acidic mixtures that may be employed in the sols according to the invention.

Examples of resins which are particularly suitable are the product sold under the name URADIL AZ554 by DSM Resins, which takes the form of an oil emulsion of an alkyd resin, and the product sold under the name Incorez 170 by Industrial Copolymer Limited, which is a bisphenol A epoxy resin.

The organic binder, and particularly the preferred alkyd resin binder or the preferred epoxy binder as mentioned above, is used generally in an amount of 0% to 30% on the basis of the total weight of the sol.

The organic binder allows the flexural properties of the film to be improved, in order to optimize its characteristics of resistance under stress, such as its flexibility, shock resistance and low-temperature tensile strength, etc.

The organic binder may also allow improvements in the anti-corrosion properties of the film obtained from the sol, since it enables even thicker films to be obtained that are more like paint films.

The sol may further comprise a filler selected from micas and talcs, which, by virtue of their lamellar structures, may optimize certain properties, such as the anti-corrosion properties and the scratch resistance properties of the sol-gel film.

Talc and/or mica may be incorporated in a proportion of 1% to 20% by weight, preferably of 3% to 10% by weight.

The sol may further comprise a filler selected from kaolins, which appears to react with the alkoxides or enters intimately into the formation of the network, and thereby allows thicker films to be obtained, while lowering the cost of the product.

A filler of this kind, when present, represents generally from 3% to 15%, preferably from 5% to 10% by weight of the sol.

The sol according to the invention may further comprise at least one additional compound selected from organometallic compounds and organosilane compounds other than the organometallic compounds and organosilane compounds a) and b) as described above. When they are present, such compounds are generally present in a proportion of 1% to 10% by weight for the additional organometallic compound or compounds, and in a proportion of 2% to 5% by weight for the additional organosilane compound or compounds.

The additional organometallic compounds other than the compounds a) may include all organometallic compounds containing a metal other than zirconium, aluminium and titanium, such as cerium, yttrium, lanthanum, lead, tin, antimony, boron, vanadium, indium, niobium, bismuth and hafnium.

Mention may be made, for example, of all of the alkoxides/alcoholates of metals other than zirconium, aluminium and titanium, and also compounds such as yttrium acetate trihydrate, or other hydrates; yttrium nitrate; cerium acetate hydrate; sodium acetylacetonate hydrate; cerium stearate; lanthanum nitrate hexahydrate; lanthanum acetate hydrate; and lanthanum acetylacetonate.

Among the additional organosilane compounds other than the organosilane compounds b) the compounds of formula (IV) may be cited:

$$Si(R_1)_4 \qquad (IV),$$

where $R_1$, represents a removable, separable, hydrolysable radical as already defined above; preferably $R_1$ is an alkoxy group of 1 to 4 carbon atoms, such as methoxy, ethoxy, n-propoxy, isopropoxy, sec-butoxy, or tert-butoxy.

The additional organosilane compounds other than the organosilane compounds b) may also be selected from fluorosilanes. Such fluorosilanes are described, for example, in the document DE-A-4118184 and the document U.S. Pat. No. 6,361,868, whose descriptions can be used as references. Examples of these fluorosilanes are as follows:

$C_2F_5CH_2$—$CH_2$—$SiY_3$
n-$C_6F_{13}CH_2CH_2$—$SiY_3$
n-$C_8F_{17}CH_2CH_2$—$SiY_3$
n-$C_{10}F_{21}CH_2CH_2$—$SiY_3$
(Y=$OCH_3$, $OC_2H_5$ or Cl)
i-$C_3F_7O$—$(CH_2)_3$—$SiCl_2$ $(CH_3)$
n-$C_6F_{13}CH_2CH_2SiCl_2$ $(CH_3)$
n-$C_6F_{13}CH_2CH_2SiCl$ $(CH_3)_2$.

Other fluorosilanes are described in the document U.S. Pat. No. 6,482,525 and the document EP-A-587 067, whose descriptions can also be used as references.

The sol according to the invention may further comprise one or more metal salts, for example one or more rare earth metal salts. The rare earth salts may be selected from rare earth metal esters such as cerium acetates and oxalates and lanthanum and cerium chlorides. Alkali and alkaline-earth metal vanadates such as sodium metavanadate and calcium metavanadate. Other metal salts are alkali and alkaline-earth metal borates such as barium metaborate. The sol according to the invention may comprise any combination of these metal salts. Reference may be made with regard to these salts to the document U.S. Pat. No. 5,806,562.

When present, the metal salts are generally present in an amount of 0.5% to 5% by weight in the sol.

The sol according to the invention may further comprise one or more conductive materials selected, for example, from salts, electrolytes, redox couples, conductive polymers of polyaniline type, ferrocenes, sulfurated polystyrene, carbon blacks, and all of the other compatible products having the characteristic of conducting electrical charges.

The sol according to the invention may further comprise a colorant matrix selected from dyes, pigments and nacres.

The pigments may be selected from decorative pigments and pigments used to enhance the conductivity and/or reflectivity of the film.

One particularly preferred sol according to the invention comprises, in percent by weight:

a)—3% to 30%, preferably 5% to 20%, more preferably 7% to 15%, especially 8% to 14%, more especially 10% to 13%, for example 10.8% or 12%, of tetra-n-propoxyzirconium (TPOZ), aluminium or titanium;

b)—5% to 50%, preferably 5% to 40%, more preferably 10% to 40%, especially 15% or 20% to 30%, for example 22% or 23%, of 3-glycidyloxypropyl-trimethoxysilane (GLYMO);

c)—1% to 15%, preferably 2% to 10%, more preferably 3% to 8%, for example 5%, of at least one compound selected from acids, bases, glycols and ethoxyethanol;

d)—the remainder to 100% of demineralized or distilled water;

the total weight amount of a) and b) being greater than 30%, preferably greater than 31.2%; 31.5%; 32%; or 33%, more preferably greater than 35%, especially greater than 40%, more especially greater than 50%.

The GLYMO may advantageously be replaced by GLYEO.

The sol can be prepared a certain time before deposition on the substrate, by mixing of the four main components, a), b), c) and d), defined above; however, in one preferred embodiment according to the invention, the sol may be prepared from a kit in two parts, A and B.

The first part A, in liquid form, comprises components a), c) and d) of the sol, as have been described above, and the second part B, in liquid form, comprises component b) of the sol, as defined above. The first part, A, typically comprises, for example, a zirconium alkoxide (for example TPOZ) hydrolysed in a distilled water solution containing acetic acid and also, optionally, one or more additives, and part B comprises a silane (such as GTMS) or a mixture of pure silanes.

The sol to be applied, deposited on the substrate, is obtained by simply mixing two liquid products formed by parts A and B, in place of four or more products, some of which are solid, in the prior art. The two liquid constituents (parts A and B) are very easy to mix, using conventional stirrer systems, or even manually, in the case of small amounts. The two parts A and B are stable on storage in a correctly adapted pack or container for periods ranging, for example, from 1 month to 2 years, if simply homogenized prior to use.

Part A represents generally from 50% to 90% by weight of the sol to be prepared, and part B, consequently, represents generally from 10% to 50% by weight of the sol to be prepared.

After the mixing of all of the components or else two parts A and B, the sol obtained may be applied within a time of 0 minute to 24 months, preferably of 0 minute to 12 months, more preferably of 0 minute to 6 months, especially of 30 minutes to 8 hours.

The time which passes between the point at which the sol is prepared by mixing the four components or the two parts A and B allows the sol to be aged. This time depends on the rates of hydrolysis of the organometallic compounds, for example zirconium alkoxides, and of the organosilane.

An optimum ageing time is generally that for which the compound of zirconium and the silane are sufficiently hydrolysed for the silicon and the zirconium to react with the surface, for example the metallic surface of the substrate.

It should be noted that the zirconium compound is already present in hydrolysed form in the part A which comprises distilled water.

The deposition of the sol on the surface, which preferably has been cleaned and/or activated beforehand, may be accomplished by any technique known to the skilled person, such as spraying, sprinkling or dipping, where one preferred technique is the technique of spraying.

The operation of depositing—applying—the sol to the surface is generally carried out at a temperature of 0 to 80° C., preferably of 20 to 60° C., for example of 50° C.

After deposition, a substrate is obtained whose surface is coated with a layer of sol.

This sol layer is subsequently dried in a way known in this field of the art. Drying is generally carried out at a temperature of 0° C. to 500° C., preferably of 50 to 150° C., more preferably of 80° C. to 130° C. for a time, for example, of 1 second to 2 hours, preferably of 5 minutes to 1 hour, more preferably of 20 to 30 minutes, depending on the mode of drying that is used.

Drying may be carried out by heating the substrate in the open air or in an oven or using very rapid heating means which are available commercially and are known to the skilled person. Drying, furthermore, may be coupled with UV crosslinking.

It is also possible to carry out a drying cycle like that described in the document U.S. Pat. No. 5,814,137 in column 11, lines 15 to 23.

Alternatively it is possible to carry out a ceramic melting treatment at a temperature that may possibly be up to 2500° C., for example from 800 to 1500° C.

The sol layer may advantageously be dried by moveable thermal means such as pulsed-air thermal strippers (paint burners), infrared radiant heating means, etc., particularly in the context of the repair of existing equipment or equipment which is difficult to bake in closed chambers.

It is possible to deposit only a single sol-gel layer by the process according to the invention; this sol-gel layer generally has a dry thickness of 0.5 to 20 µm. Owing to the high concentration of the components of the sol according to the invention, it has been seen that excellent results in terms of corrosion resistance can be achieved with a single sol-gel layer according to the invention. This layer generally has a thickness greater than that of the sol-gel layers of the prior art prepared from diluted sols, namely a dry thickness of 0.1 to 0.4 µm, preferably of 0.2 to 0.3 µm.

It is also possible to deposit two or more sol-gel layers so as to form a multi-layer coating, each layer having a composition different from the preceding layer and from the following layer, and each deposited layer exhibiting different properties, selected from the properties set out below. Generally speaking, it is possible to deposit from 1 to 5 layers, preferably from 2 to 3 layers.

According to the various additives incorporated in the sol, the deposited sol-gel layer will be able to possess a variety of properties.

The skilled person is easily able to determine what additive or additives should be incorporated, where appropriate, into the sol according to the invention, which compulsorily comprises components a), b), c) and d) mentioned above, in order to obtain sol-gel layers which possess the properties below. Thus it will be possible to prepare anti-scratch; anti-abrasion; anti-friction; anti-fog; anti-static; anti-reflection; electroluminescent; photo-variable; conducting (high and low K); superconducting; ferroelectric (piezoelectric and pyroelectric); barrier (to gases; to bases, to acids, to various chemical products, including strippers, hydraulic fluids such as "Skydrol"); soil-repellent; thermochromic; luminescent; non-linear optical; flame-retardant; sol-gel coating for composites; anti-adherent (adhesive resistant); insulating; anti-fouling; primer; paint; hydrophobic; hydrophilic; porous; biocidal; anti-odour; and anti-wear sol-gel layers, etc.

According to the invention it is also possible to prepare a multi-layer coating exhibiting any combination of properties from among those set out above.

The invention will now be described with reference to the examples which follow, and which are given by way of illustration and not of limitation.

EXAMPLES

Example 1

In this example, a sol according to the invention is prepared from a first part or component A and from a second part or component B, said sol is applied to aluminium specimens, and the properties of the sol-gel layer prepared are evaluated.

1.1. Preparation of mixture A
In a perfectly clean 1 litre beaker, exactly 108 g of TPOZ at 70% in 1-propanol are weighed out;
With gentle stirring, exactly 50 g of 96% acetic acid are added;
After homogenization, exactly 622 g of distilled water are added with stirring;
Stirring is continued until a clear, homogeneous liquid is obtained (approximately 1 hour);
To accelerate the hydrolysis reaction, heating can be carried out up to approximately 60° C.;
The mixture is filtered through filter paper and then stored in a perfectly airtight flask.

1.2. Preparation of the Sol
In a perfectly clean 2 litre beaker, exactly 680 g of mixture A (component or part A) are poured out, and then, with stirring, exactly 220 g of GLYMO (glycidyloxypropyltrimethoxysilane at 98%) (component B or part B) are poured out;
Stirring is continued until a clear, homogeneous phase is obtained (approximately 1 hour);
To increase the hydrolysis reaction, heating may be carried out up to approximately 60° C.;
The mixture is filtered on laboratory filter paper and then stored in a hermetically sealed flask.
N.B.: The weight solids content of such a mixture is of the order of 20%. The weight solids content of the sol is the amount of solid that remains after heating the sol to a certain temperature during a certain period of time.

1.3. Application of the Sol
2024 T3 aluminium specimens are prepared in accordance with the procedure described below:
degreasing with an alkaline detergent diluted in water at a temperature of 60° C. for a time of 10 minutes with stirring;
rinsing with mains water and with distilled water;
deoxidizing with a sulphonitric acid mixture, for example, for 10 min at 20 to 50° C.;
rinsing with mains water and with distilled water;
drying of the specimen with pulsed hot air;
The specimens are placed on a support in a spray booth;
Within a time of a few hours, the solution prepared beforehand (1.2.) is applied by means of a pneumatic gun, such as a Graco Delta-spray pneumatic gun, the air pressure being set at approximately 5-6 bar;
The surface is covered effectively, in exactly the same way as for the application of a primer or a paint, and then, within a time of a few minutes to 1 hour, the specimens are placed in the oven, which is set at 110° C., for example;
After a time of a few minutes to 1 hour, the specimens are withdrawn and left to cool.

1.4. Inspection of Specimens
After cooling, the sol-gel layer obtained has the following characteristics:
Adhesion to the aluminium support;
Very good adhesion of the paints and primers applied to the sol-gel layer;
Very good corrosion protection (salt-spray and filiform corrosion) of the support;
Thickness deposited being from 1 to 10 microns (measured by an Elcometer 355) apparatus) according to the application parameters selected.
For the test known as the salt-spray test, the specimens are placed in a Q-FOG Cyclic Corrosion tester climatic chamber from Q-Panel. The specimens treated with the sol according to the invention exhibit no corrosion after 168 hours.

Example 2

In this example, a sol according to the prior art is prepared from components A, B, C and D. Said sol is applied to aluminium specimens, and the properties of the sol-gel layer prepared are evaluated.

2.1. Preparation of the Sol
A component A composed of a few grams of acetic acid is mixed with a component B composed of a few grams of a zirconium alkoxide at 70% in n-propanol;
A component C, composed of a few grams of GLYMO silane, is mixed with a component D, composed of approximately 950 grams of distilled water;
The compound (A+B) is mixed with the compound (C+D);
The mixture is left to act for approximately 30 minutes.
N.B.: The solids content of such a mixture is less than 5% by weight.

2.2. Application of the Sol
Aluminium specimens are prepared in the same way as in Example 1, and the sol is applied by spraying, using the same equipment and the same conditions as those described above in Example 1.

2.3. Inspection of the Specimens
Adhesion to the aluminium support;
Very good adhesion of the paints and primers applied to the sol-gel layer;
Very substantial sags, difficult homogeneous wetting of the entire surface (observable particularly in the course of drying);
Thickness, measured after drying: 200 to 400 nanometres maximum;
The salt-spray test, carried out as in Example 1, shows that the protection provided by the sol-gel layer prepared with the prior-art sol is less than 24 hours. Points of corrosion on the metal are observed even after a few hours.

The invention claimed is:
1. A sol for the sol-gel coating of a surface, said sol comprising, in percent by weight:
a)—5% to 20% of at least one organometallic compound of zirconium, aluminium or titanium;
b)—5% to 50% of at least one organosilane compound;
c)—1% to 15% of at least one compound selected from acids and bases; and
d)—a remainder to 100% of demineralized or distilled water, wherein
a total amount of a) and b) is greater than 30%, and
the sol comprises 0-5% of organic solvents, wherein any such organic solvents are non-toxic or non-noxious solvents.

2. The sol according to claim 1, wherein said non-toxic or non-noxious organic solvents are selected from non-toxic and non-noxious 3 to 10C aliphatic alcohols.

3. The sol according to claim 1, having a weight solids content of more than 4%.

4. The sol according to claim 1, wherein a ratio of the organosilane compound to the organometallic compound is from 1.5to 6.

5. The sol according to claim 1, wherein the organometallic compound is of formula (I) or of formula (II) below:

in which M represents Zr or Ti, R represents a separable, removable or hydrolysable radical, R' represents a non-separable, non-removable or non-hydrolysable radical and x is from 1 to 4 in a case of the formula (I) or from 1 to 3 in a case of the formula (II), and, if two or more radicals R and/or R' are present in a compound of the formula (I) or of the formula (II), they can be, respectively, identical or different.

6. The sol according to claim 5, wherein the removable, separable or hydrolysable radical or radicals R is or are generally selected from halogens F, Cl, Br, and I; alkoxy groups of $C_1$ to $C_{10}$ linear or branched alkoxy groups; cycloalkyloxy groups of $C_3$ to $C_{10}$ cycloalkyloxy groups; aryloxy groups of $C_6$ to $C_{10}$ aryloxy groups; acyloxy groups of $C_1$ to $C_4$ acyloxy groups; alkylcarbonyl groups; and ($C_1$ to $C_6$) alkoxy-($C_2$ to $C_3$)-alkyl groups.

7. The sol according to claim 5, wherein the non-removable, non-separable or non-hydrolysable radical or radicals R' is or are generally selected from hydrogen; a hydroxyl group; alkyl groups of $C_1$ to $C_{10}$; linear or branched alkyl groups; alkenyl groups of $C_2$ to $C_4$; alkynyl groups of $C_2$ to $C_4$; aryl groups of $C_6$ to $C_{10}$; and methacryl and methacryloxypropyl groups.

8. The sol according to claim 5, wherein the organometallic compound is of formula $MR_4$ or $AlR_3$, in which M and R are as defined in claim 5.

9. The sol according to claim 8, wherein each of the 4 radicals R of $MR_4$ or each of the 3 radicals R of $MR_4$ or each of the 3 radicals R of $AL_3$ are all identical and represent a same group.

10. The sol according to claim 9, wherein the organometallic compound is tetra-n-propoxyzirconium ("TPOZ") or tetraisopropoxyzirconium.

11. The sol according to claim 1, wherein the organosilane compound is a compound having attached to silicon at least one non-removable, non-separable, non-hydrolysable radical and at least one removable, separable, hydrolysable radical.

12. The sol according to claim 11, wherein the organosilane compound contains 2 or 3 removable, separable or hydrolysable radicals and one or two non-separable, non-removable or non-hydrolysable radical(s).

13. The sol according to claim 12, wherein said separable, removable or hydrolysable radical or radicals is or are selected from halogens F, Cl, Br, and I; alkoxy groups of $C_1$ to $C_{10}$, linear or branched alkoxy groups; cycloalkyloxy groups of $C_3$ to $C_{10}$ cycloalkyloxy groups; aryloxy groups of $C_6$ to $C_{10}$ aryloxy groups; acyloxy groups of $C_1$ to $C_4$ acyloxy groups; and alkylcarbonyl radicals.

14. The sol according to claim 11, wherein said non-separable, non-removable or non-hydrolysable radical or radicals is or are selected from hydrogen; hydroxyl group; mercapto group; cyano group; alkyl groups of $C_1$ to $C_{10}$; linear or branched alkyl groups; alkenyl groups of $C_2$ to $C_4$; alkynyl groups of $C_2$ to $C_4$; aryl groups of $C_6$ to $C_{10}$; alkylaryl groups; arylalkyl groups; (meth)acryl and (meth)acryloxypropyl groups; glycidyl and glycidyloxy groups; and groups selected from alkyl, alkenyl, alkynyl, alkylaryl and arylalkyl groups comprising at least one group selected from primary, secondary or tertiary amino groups in which the non-hydrolysable radical is an aminoaryl or aminoalkyl group—amide, alkylcarbonyl, substituted or unsubstituted aniline, aldehyde, ketone, carboxyl, anhydride, hydroxyl, alkoxy, alkoxycarbonyl, mercapto, cyano, hydroxyphenyl, alkyl carboxylate, sulphonic acid, phosphoric acid, (meth)acryloyloxy groups, groups containing an epoxide ring, allyl and vinyl groups.

15. The sol according to claim 11, wherein said separable and non-separable radicals are, in addition, substituted by one or more substituents selected from alkoxy groups and halogen atoms.

16. The sol according to claim 11, wherein the organosilane compound is
Si($R_1$')($R_1$)$_3$, where the radicals $R_1$ are identical or different from one another and represent a separable, removable or hydrolysable group selected from halogens F, Cl, Br and I, alkoxy groups of $C_1$ to $C_{10}$; linear or branched alkoxy groups; cycloalkyloxy groups of $C_3$ to $C_{10}$; aryloxy groups of $C_6$ to $C_{10}$; acyloxy groups of $C_1$ to $C_4$; and alkylcarbonyl radicals; and $R_1$' is a non-removable, non-separable or non-hydrolysable selected from a glycidyl or glycidyloxy-$C_1$ to $C_{20}$ alkylene group; and a group containing at least one primary, secondary or tertiary amino group selected from the 3-aminopropyl, N-(2-aminoethyl)-3-aminopropyl and N—[N'-(2'-aminoethyl]-2-aminoethyl]-3-aminopropyl groups.

17. The sol according to claim 11, wherein the organosilane compound is selected from the following compounds:
allyltrimethoxysilane,
N-(2-aminoethyl)-3-aminopropyltrimethoxysilane,
N—[N'-(2'-aminoethyl)-2-aminoethyl]-3-aminopropyl-trimethoxysilane,
3-aminopropyltrimethoxysilane,
3-glycidyloxypropyltrimethoxysilane,
3-mercaptopropyltrimethoxysilane,
3-methacryloxypropylmethyldimethoxysilane,
3-methacryloxypropyltrimethoxysilane,
N-phenylaminopropyltrimethoxysilane, and
vinyltrimethoxysilane.

18. The sol according to claim 17, wherein the organosilane compound is 3-glycidyloxypropyltrimethoxysilane (GLYMO).

19. The sol according to claim 1, wherein the organosilane compound is selected from compounds whose hydrolysis reaction does not lead to the formation of methanol.

20. The sol according to claim 19, wherein the organosilane compound is selected from the following compounds:
3-aminopropyltriethoxysilane,
p-aminophenylsilane,
3-aminopropyltriethoxysilane,
3-glycidyloxypropyldiisopropylethoxysilane,
3-glycidyloxypropyltriethoxysilane,
(3-glycidyloxypropyl)methyldiethoxysilane,
3-mercaptopropyltriethoxysilane,
3-methacryloxypropylmethyldiethoxysilane,
vinylmethyldiethoxysilane, and
vinyltriethoxysilane.

21. The sol according to claim 20, wherein the organosilane compound is 3-glycidyloxypropyltriethoxysilane (GLYEO).

22. The sol according to claim 1, wherein component c) is an acid selected from organic carboxylic acids and mineral, inorganic acids and mixtures thereof.

23. The sol according to claim 1, wherein component c) is a base selected from ethanolamine, triethylamine and mixtures thereof.

24. The sol according to claim 1, further comprising at least one surfactant selected from ionic surfactants and non-ionic surfactants.

25. The sol according to claim 1, further comprising at least one organic binder.

26. The sol according to claim 1, further comprising a filler selected from mica and talc.

27. The sol according to claim 26, wherein the filler is present in a proportion of 1% to 20%, by weight.

28. The sol according to claim 1, further comprising a filler comprising kaolin.

29. The sol according to claim 1, further comprising at least one additional compound selected from organometallic compounds and organosilane compounds other than the at least one organometallic compound a) and at least one organosilane compound b).

30. The sol according to claim 29, wherein said at least one additional organometallic compound other than the at least one organometallic compound a) is selected from organometallic compounds containing a metal other than zirconium, aluminium and titanium, and selected from the group consisting of cerium, yttrium, lanthanum, lead, tin, antimony, boron, vanadium, indium, niobium, bismuth and hafnium.

31. The so according to claim 30, wherein said at least one additional organometallic compound other than the at least one organometallic compound a) is selected from alkoxides/alcoholates of metals other than zirconium, said compounds being selected from the group consisting of yttrium acetate trihydrate, or other hydrates; yttrium nitrate; cerium acetate hydrate; cerium acetylacetonate hydrate; cerium stearate; lanthanum nitrate hexahydrate; lanthanum acetate hydrate; and lanthanum acetylacetonate.

32. The sol according to claim 29, wherein said at least one additional organosilane compound is a compound of

where $R_1$ represents a removable, separable, hydrolysable radical selected from halogens F, Cl, Br and I, alkoxy groups of $C_1$ to $C_{10}$; linear or branched alkoxy groups; cycloalkyloxy groups of $C_3$ to $C_{10}$; aryloxy groups of $C_6$ to $C_{10}$; acyloxy groups of $C_1$ to $C_4$; and alkylcarbonyl radicals.

33. The sol according to claim 29, wherein said at least one additional organosilane compound is a fluorosilane.

34. The sol according to claim 33, wherein said fluorosilane is selected from the following compounds:

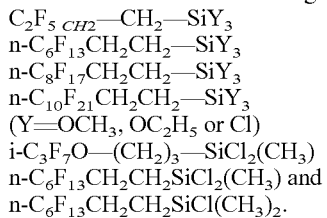

i-$C_3F_7O$—$(CH_2)_3$—$SiCl_2(CH_3)$
n-$C_6F_{13}CH_2CH_2SiCl_2(CH_3)$ and
n-$C_6F_{13}CH_2CH_2SiCl(CH_3)_2$.

35. The sol according to claim 1, further comprising one or more metal salts selected from one or more rare earth metal salts.

36. The sol according to claim 1, further comprising at least one conductive material.

37. The sol according to claim 1, further comprising a colorant selected from dyes, pigments and nacres.

38. The sol according to claim 1, comprising in percent by weight:
a)—5% to 20%, of tetra-n-propoxyzirconium (TPOZ), aluminium or titanium;
b)—5% to 50%, of 3-glycidyloxypropyltrimethoxysilane (GLYMO);
c)—1% to 15%, of at least one compound selected from acids, bases, glycols and ethoxyethanol; and
d)—the remainder to 100% of demineralized or distilled water;
the total weight amount of a) and b) being greater than 30%.

39. A kit comprising:
a first container containing a first part A, in liquid form, comprising components a), c) and d) of the sol as defined in claim 1;
a second container containing a second part B, in liquid form, comprising component b) of the sol as defined in claim 1.

40. The kit according to claim 39, wherein part A represents from 50% to 90% by weight and part B represents from 10% to 50% by weight of the sol to be prepared.

41. A process for preparing a sol-gel layer on a surface of a substrate, wherein:
depositing the sol according to claim 1 on said surface to give a sol layer on the surface of the substrate; and
drying said sol layer to give a sol-gel layer on the surface of the substrate.

42. The process according to claim 41, wherein, in a single operation, the sol-gel layer is deposited with a dry thickness of 500 nm to 20 μm.

43. The process according to claim 41, wherein the sol is heated beforehand and/or during the depositing.

44. The process according to claim 41, further comprising filtering the sol is prior to the depositing.

45. The process according to claim 41, wherein the sol is deposited by spraying, sprinkling or dipping.

46. The process according to claim 41, wherein the substrate is made of a material selected from metals; metal alloys; organic or mineral, inorganic glasses; organic materials; plastics; wood; ceramics; textiles; concretes; papers; stone; and composite materials comprising two or more of these materials.

47. The process according to claim 46, wherein the substrate is made of a material selected from aluminium; titanium; copper; iron; and alloys thereof.

48. The process according to claim 46, further comprising applying a surface treatment, wherein the surface treatment is selected from simple and chromate conversion layers, anodizing layers, or other layers.

49. The process according to claim 41, wherein, before the depositing of the sol, the surface is cleaned and/or activated and/or pickled by a chemical and/or physical and/or mechanical treatment.

50. The process according to claim 41, further comprising preparing the sol by mixing components a), b), c) and d).

51. The process according to claim 50, wherein the sol is applied to the surface of the substrate within a time of 0 minutes to 24 months after the mixing of components a), b), c) and d).

52. The process according to claim 41, wherein the drying of the sol layer is carried out at a temperature of 0 to 500° C. for a time of 1 second to 2 hours.

53. The process according to claim 41, wherein the drying of the sol layer is carried out using pulsed-air thermal strippers, paint burners, or infrared radiant heating devices.

54. The process according to claim 41, wherein the sol-gel layer deposited has a dry thickness of 0.5 to 20 μm.

55. The process according to claim 41, wherein said sol-gel layer is a layer selected from anti-scratch; anti-abrasion; anti-friction; anti-fog; anti-static; anti-reflection; electroluminescent; photovariable; conducting high or low K; superconducting; ferroelectric; piezoelectric; pyroelectric; barrier gas; barrier acid, barrier stripper; barrier hydraulic fluid; soil-repellent; thermochromic; luminescent; non-linear optical; flame-retardant; sol-gel coating for composites; anti-adherent; adhesive resistant; insulating; anti-fouling; primer; paint; hydrophobic; hydrophilic; porous; biocidal; anti-odour; and anti-wear sol-gel layers.

56. A sol-gel layer preparable by the process according to 41.

57. A substrate comprising at least one surface coated with at least one sol-gel layer according to claim 56.

58. A method for imparting corrosion resistance properties to a surface of a substrate or to a surface made of a material selected from metals, metal alloys and composite materials comprising a metal or a metal alloy by applying the sol-gel layer according to claim 56.

59. The method according to claim 58, wherein said surface is coated only with said sol-gel layer.

60. A process for preparing a coating comprising two or more layers on a surface of a substrate, wherein at least one of these layers is a sol-gel layer prepared by the process according to claim 41.

61. The process according to claim 60 for preparing a coating comprising two or more layers on a surface of a substrate, wherein:
a sol-gel layer is prepared on said surface; then
one or more other layers is or are applied to said sol-gel layer, wherein said other layer(s) is selected, from paint, primer, mastic, adhesive and resin layers.

62. The process according to claim 61, wherein said layer or layers are applied to the sol-gel layer immediately after its preparation.

63. The process according to claim 62, wherein said layer or layers are applied to the sol-gel layer within a time of one month to ten years after the preparation of the sol-gel layer.

64. The process according to claim 60, wherein the coating comprises two or more identical or different sol-gel layers and optionally one or more other layers.

65. The process according to claim 64, wherein said sol-gel layers are selected from anti-scratch; anti-abrasion; anti-friction; anti-fog; anti-static; anti-reflection; electroluminescent; photovariable; conducting high or low K; superconducting; ferroelectric; piezoelectric; pyroelectric; barrier gas; barrier acid, barrier stripper; barrier hydraulic fluid; soil-repellent; thermochromic; luminescent; non-linear optical; flame-retardant; sol-gel coating for composites; anti-adherent; adhesive resistant; insulating; anti-fouling; primer; paint; hydrophobic; hydrophilic; porous; biocidal; anti-odour; and anti-wear sol-gel layers.

* * * * *